Feb. 13, 1923.

F. W. DE LUCHI.
ELECTRIC HEATER.
FILED FEB. 13, 1922.

Inventor
Frank W. DeLuchi.

By Harry R Schroeder
Attorney

Feb. 13, 1923.

F. W. DE LUCHI.
ELECTRIC HEATER.
FILED FEB. 13, 1922.

Inventor
Frank W. DeLuchi.

By Harry C. Schroeder
Attorney

Patented Feb. 13, 1923.

1,444,958

UNITED STATES PATENT OFFICE.

FRANK W. DE LUCHI, OF OAKLAND, CALIFORNIA.

ELECTRIC HEATER.

Application filed February 13, 1922. Serial No. 536,173.

*To all whom it may concern:*

Be it known that I, FRANK W. DE LUCHI, a citizen of the United States, residing at Oakland, in the county of Alameda and State of California, have invented certain new and useful Improvements in Electric Heaters, of which the following is a specification.

My invention is an electric heater constructed with air circulating means through which the air of the room is circulated whereby the room is efficiently heated.

Referring to the annexed drawings in which my invention is illustrated and which forms a part of this specification:

Figure 1:
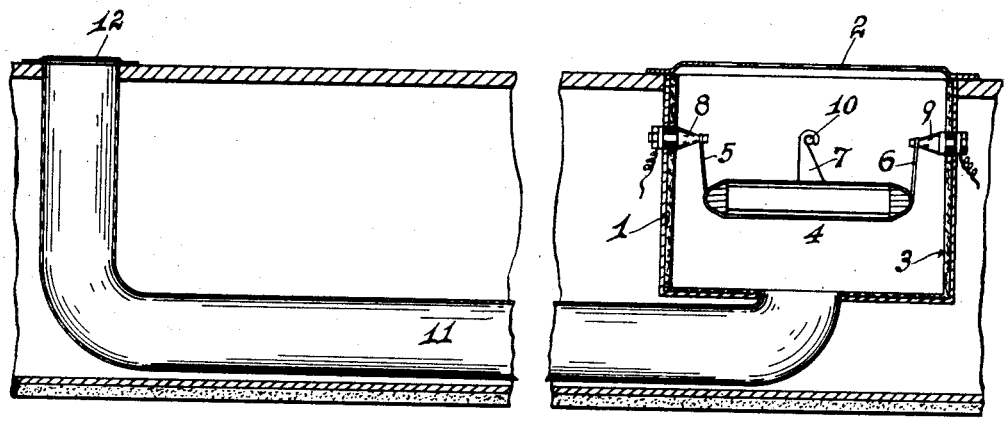
Figure 1 is a vertical section of one form of my heater.

In the form of my invention shown in Figure 1 there is a heating chamber 1 which is suspended in the floor of the room between the floor and the ceiling of the room below, the top of which chamber is covered with a perforated wall or grid 2 which rests on the floor over the chamber. The chamber may be lined with a lining of asbestos 3. An electric heating element 4 is suspended in the chamber 1 by means of hooks 5, 6 and 7 secured to said element and binding posts 8 and 9 and pins 10 projecting inwardly from the vertical wall of said chamber, the hooks 5 and 6 engaging the binding posts 8 and 9 and the hooks 7 engaging the pins 10. An air duct 11 extends between the floor and the ceiling below, one end of said duct communicating with the room through the floor at a distance from the chamber 1 and the other end of said duct communicating with the bottom of said chamber. A perforated plate or grid 12 rests on the floor over the end of the duct 11 which communicates with the room.

Cold air enters the duct 11 from the room and passes through the chamber 1 where it is heated and passes out of the top of the chamber back into the room, thus providing a circulation of the air through the room and the heater and efficiently heating the room.

Figure 2:
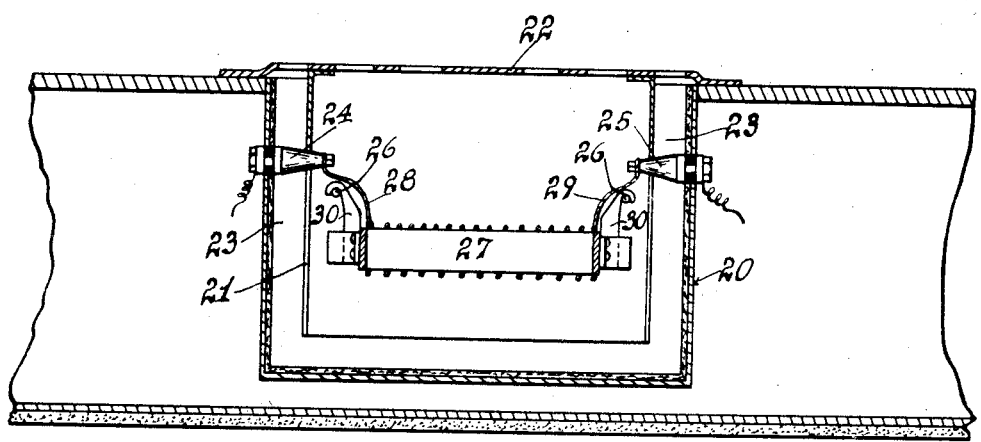
Figure 2 is a vertical section of another form of my heater.

In the form of my invention shown in Figure 2 a chamber 20 is suspended in and below the floor and a heating chamber 21 is suspended within the chamber 20 from a grid 22 which rests upon the floor over the chamber 20. The chamber 21 is open at the bottom and top and a vertical cold air inlet duct 23 is provided between the vertical wall of said chamber and the chamber 20 which duct communicates at its upper end with the room through the grid 22 and at its lower end with the lower end of the chamber 21. Binding posts 24 and 25 project inwardly from the vertical wall of the chamber 20 into the chamber 21 through the vertical slotted walls of said chamber, the slots in said walls extending upwardly from the lower edge of said wall to allow the chamber 21 to be lowered over said binding posts. Pins 26 project inwardly from the vertical wall of the chamber 21. An electrical heating element 27 is suspended within the heating chamber 21 by hooks 28, 29 and 30, the hooks 28 and 29 engaging the binding posts 24 and 25 and the hooks 30 engaging the pins 26.

Cold air enters the duct 23 through the grid 22 and passes into the bottom of and through the chamber 21 and grid 22 and is heated by element 27.

Figure 3:
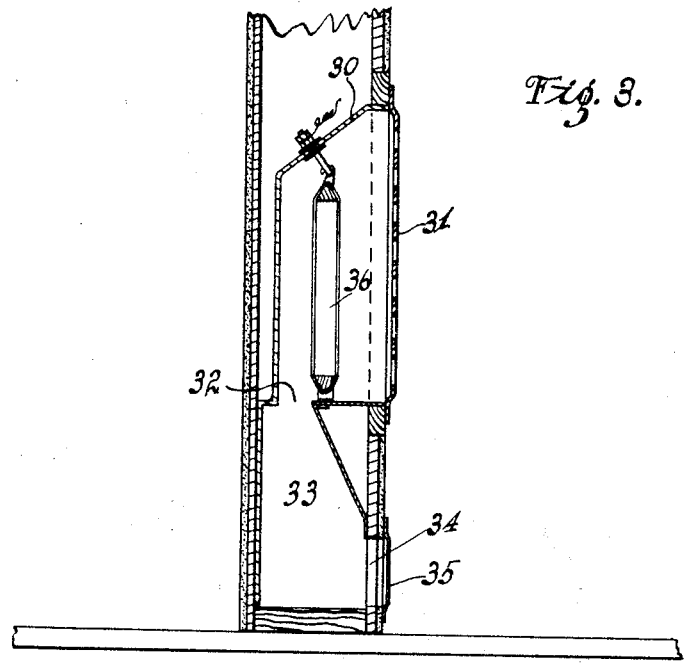
Figure 3 is a vertical section of another form of my heater.

In the modified form of my invention shown in Figure 3 a heating chamber 30 is mounted in the wall of the room a short distance above the floor and communicates with the room through a grid 31 which rests against the wall and forms the outer wall of the chamber. Said chamber is provided with an inlet 32 in the bottom thereof which communicates with the upper end of a duct 33 in the wall below the chamber, the lower end of said duct communicating with a cold air inlet 34 in the lower part of the wall. A grid 35 rests against the wall over the inlet 34. An electric heating element 36 is mounted in the chamber 30.

Cold air enters the duct 33 through inlet 34 and passes through the casing 30 where the air is heated by heating element 36 and passes through grid 31 into the room.

Figure 4:
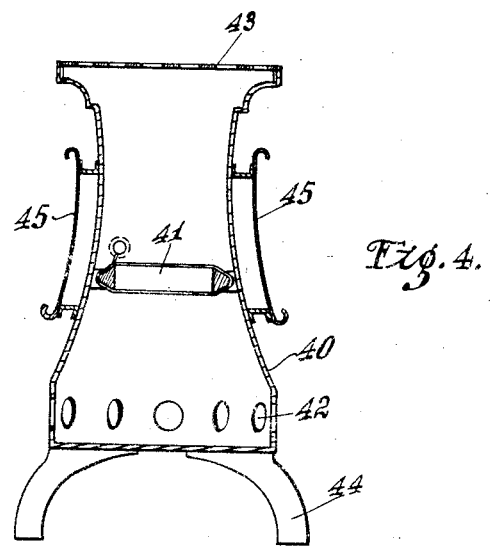
Figure 4 is a vertical section of another form of my heater.

My heater shown in Figure 4 is a portable or electric stove heater comprising a casing 40 and an electric heating element 41 mounted in said casing, the lower end of the casing having cold air inlets 42 and the top of the casing being covered with a grid 43. The casing 40 may be mounted on legs 44. Handles 45 may be secured on the sides of the casing for carrying the heater about from place to place.

Having described my invention, I claim:

1. An electric heater comprising a heating chamber provided with an air inlet and an outlet, binding posts mounted in the walls of said chamber, an electric heating element, and hooks on said electric heating element for engaging said binding posts and suspending said element in said heating chamber, said hooks forming the conductors between said binding posts and the coil of said heating element.

2. An electric heater including a heating chamber provided with an inlet and an outlet, pins and binding posts secured to the walls of said chamber, an electric heating element, and hooks on said heating element, certain of said hooks engaging said pins and the other hooks engaging said binding posts and suspending said heating element within said heating chamber, the hooks engaging said binding posts forming the conductors between said binding posts and the coil of said heating element.

3. An electric heater including a heating chamber suspended in the floor of a room, said chamber being open at the top, a grid resting on the floor over said chamber, a second chamber suspended from said grid within said first chamber, said second chamber being open at the bottom and of smaller dimensions than said first chamber so as to form an air duct therebetween communicating at its upper end with the atmosphere through said grid and at its lower end with the bottom of said second chamber, and an electric heating element mounted within said second chamber.

4. An electric heater including a heating chamber suspended in the floor of a room, said chamber being open at the top, a grid resting on the floor over said chamber, a second chamber suspended from said grid within said first chamber said second chamber being open at the bottom and of smaller dimensions than said first chamber so as to form an air duct therebetween communicating at its upper end with the atmosphere through said grid and at its lower end with the bottom of said second chamber, binding posts secured to the walls of said first chamber, said second chamber being provided with vertical slots extending from its lower edge through which slots extend said binding posts, an electric heating element, and hooks on said heating element engaging said binding posts and suspending said heating element within said second heating chamber, said hooks forming the conductors between said binding posts and the coil of said heating element.

5. An electric heater including a heating chamber suspended in the floor of a room, said chamber being open at the top, a grid resting on the floor over said chamber, a second chamber suspended from said grid within said first chamber, said second chamber being open at the bottom and of smaller dimensions than said first chamber so as to form an air duct therebetween communicating at its upper end with the atmosphere through said grid and at its lower end with the bottom of said second chamber, binding posts secured to the walls of said first chamber, said second chamber being provided with vertical slots extending from its lower edge through which slots extend said binding posts, pins on the walls of said second chamber, an electric heating element, and hooks on said heating element engaging said binding posts and said pins and suspending said heating element within said second heating chamber, the hooks engaging said binding posts forming the conductors between said binding posts and the coil of said heating element.

In testimony whereof I affix my signature.

FRANK W. DE LUCHI.